United States Patent [19]
Walsh et al.

[11] Patent Number: 5,852,083
[45] Date of Patent: Dec. 22, 1998

[54] PROCESS FOR MAKING HOT MELT ADHESIVES USING WATER SOLUBLE SUBSTITUTED LACTAM/POLYMER SOLUTIONS AS FEEDSTOCKS

[75] Inventors: William C. Walsh, Archbold, Ohio; Mark W. Waldrop, Royal Oak, Mich.

[73] Assignee: BASF Corporation, Mount Olive, N.J.

[21] Appl. No.: 865,167

[22] Filed: May 29, 1997

[51] Int. Cl.⁶ .......................... C08K 5/3415; C08J 3/02; B01F 1/00
[52] U.S. Cl. .................. 524/104; 523/332; 523/340; 523/344; 252/363.5; 252/364
[58] Field of Search ..................... 523/332, 344, 523/343; 524/104; 252/363.5, 364

[56] References Cited

FOREIGN PATENT DOCUMENTS 370844  5/1990  European Pat. Off. ............... 524/104

*Primary Examiner*—Peter A. Szekely
*Attorney, Agent, or Firm*—Joanne P. Will

[57] ABSTRACT

A process for making hot melt adhesive compositions comprising the steps of:

(a) dissolving hot melt adhesive components into a room temperature or higher solution of a water soluble substituted (e.g. NMP) to form a water soluble substituted lactam (e.g. NMP)/hot melt adhesive component solution;

(b) adding said solution formed in step (a) into water to form a solid;

(c) extracting out the water soluble substituted lactam (e.g. NMP) from said solid formed in step (b);

(d) drying of said solid wherein water soluble substituted lactam e.g. NMP, is leached out as in step (c) to form the hot melt adhesive.

26 Claims, No Drawings

PROCESS FOR MAKING HOT MELT ADHESIVES USING WATER SOLUBLE SUBSTITUTED LACTAM/POLYMER SOLUTIONS AS FEEDSTOCKS

FIELD OF INVENTION

The present invention relates to a method for the manufacture of hot melt adhesives that can be carried out at moderate temperatures; and with minimal applied shear during the mixing process. The method comprises dissolving hot melt adhesive components in water soluble substituted lactams, preferably N-methyl pyrrolidone (NMP), and then contacting this water soluble substituted lactam, preferably NMP/hot melt adhesive component solution with water, thereby causing the precipitation of a solid substance. Said solid substance, after removal of residual NMP and water, is a hot melt adhesive. The present invention is especially well suited to the use of used resin (e.g. recycle grade) as the hot melt adhesive component since said recycle grade resin does not receive any added heat history. The Applicants' process also prevents any excessive oxidation to adhesive formulations using virgin polymer as the starting hot melt adhesives component.

BACKGROUND OF INVENTION

Hot melt adhesives are a type of thermoplastic polymer based compound that liquefy upon heating and return to a solid form after cooling. Said hot melt adhesives usually contain no solvents or at most trace quantities, and are solids at room temperature. Hot melt adhesives, as opposed to liquid adhesives, which turn into active adhesive compounds after loosing water or solvent, become active upon the loss of heat. A hot melt adhesive formulation can loose heat at an extremely fast rate (compared to rather slow rates of loss of liquids from curing adhesives). This gives rise to the desirable manufacturing characteristic of fast adhesive application rates which translate into high production rates. Also, for environmental reasons, hot melt adhesives are preferable since emissions of volatile organic compounds during the application and curing processes are minimal.

Thermoplastic polymer based hot melt adhesives have been evolving since their initial use by industry during the 1950's. Different polymers, additives and curing mechanisms have continually been introduced as the end use applications demanded. Today, several hundred million pounds of hot melt adhesives are used throughout North America. Their ability to bond many diverse substrates, e.g. wood, paper, plastics, metals and textile materials, gives hot melt adhesives a utility in many different industries. Some of the largest applications for hot melt adhesives are in the automobile industry, the footwear and furniture industries, as well as the labeling and paper products industries.

Hot melt adhesives are produced by both batch processing and continuous extrusion. The continuous extrusion methods are used primarily for the production of pressure sensitive hot melt adhesives.

There are several types of batch processes in use today. The two most common batch processes use either a vertical (kettle) mixer or a horizontal (sigma blade) mixer. Both mixing processes are hot processes, the equipment and materials being blended are maintained in the 120° C. to 235° C. temperature range, depending on the adhesive polymer being compounded. Also, both mixing processes have sequential material charging processes, where different additives are added at various times during the mixing cycle, until the blend is complete. Finally, a third process, known as continuous mixing is used for manufacturing pressure sensitive adhesives.

The vertical (kettle) batch mixers are large insulated and jacketed kettles, that have three different mixing/shearing components: (1) a mixer emulsifier, (2) a high speed dispensing blade, and (3) an anchor shaped agitator. The mixer emulsifier provides a high degree of shear to all of the materials passing through it. It is used to reduce the particle size of the solids. The high speed dispensing blade (looks like a saw blade) is used to disperse the emulsified solids into the viscous adhesive that is being produced. The anchor agitator blade provides movement of the entire contents of the kettle, and scrapes the kettle wall to aid in preventing heat degradation of the adhesive. If some of the adhesive sits on the kettle wall, for an extended period of time without being scraped, it will take on heat, as the metal surface of the kettle is usually much hotter than the average temperature of the entire adhesive mix. Two companies that make this type of mixer are Ross and Baker Perkins. This type of mixture is used for the manufacture of adhesives in the viscosity range of 10,000 to 200,000 centipoise. (Viscosity is measured while adhesive is liquid.)

The horizontal (sigma blade) mixer is used for higher viscosity blends. The mixer consists of a rectangular trough curved at the bottom to form two half cylinders. Two large sigma shaped blades revolve toward each other at different speeds of rotation. The clearance between the blades and the walls of the mixer is small and causes the mixture to be sheared between the blade tip and the wall. For this type of high shear mixer, the cycle differs from that of a vertical mixer, in the order of component addition. The high viscosity components (polymers) are added first and the lower viscosity materials are added second, after the polymer is totally dispersed.

Finally, the continuous mixing process for hot melt adhesives uses a twin screw extruder as the mixing apparatus. The two screws operating in an extruder barrel at elevated temperatures, similar to those for batch processes, shear and back mix the components into a blend that continuously exits the extruder. The various components of the adhesive blend are metered into the extruder barrel at various points depending on temperature of the blend in the barrel at that point. This type of blending process is used mainly for the manufacture of pressure sensitive hot melt adhesives.

As mentioned above, various components of the adhesive formulation are added to the mixer at prescribed times during the aforementioned blending processes. A hot melt adhesive consists of several basic components, as well as some specialized additives for heat and light stability. The hot melt adhesive formulations usually consist of a thermoplastic polymer component such as polymer-rubber, or polyolefin. This polymer component gives the actual adhesive strength to the final product. A second major component is the tackifier resin. This gives a tacky feel to the adhesive system as it cools, which aids in cling to the substrate as the polymer portion cools to its final adhesive state. Another major component in hot melt adhesive formulations is the oil or wax diluents, added to reduce viscosity of the adhesive in the hot state. The specialized additives are usually antioxidants or ultraviolet light inhibitors (if yellowing becomes a problem).

Some common polymer components used in hot melt adhesive formulations are polyamides (nylons), polyesters, polystyrene, styrene based polymers such as styrene butadiene rubber, styrene isoprene rubber, and polymers based on ethylene vinyl acetate, poly acrylate based polymers, polyvinyl chloride, and urethane resin systems. Various polyolefins, such as polyethylene are also used as the thermoplastic or rubber component.

Some common tackifier resins are the various rosin or rosin ester systems, aromatic hydrocarbon resin systems (usually coal tar extracts), terpene resins, aliphatic hydrocarbon resins (containing some small degree of unsaturation) and heat reactive tackifier resin systems (usually a blend of aromatic and aliphatic diene resins). The thermoplastic polymer chosen as the base for the adhesive will determine the tackifier resin choice. Usually the tackifier resin has a lower flow point than the base polymer.

The diluent oils can be phthalate plasticizers or low molecular weight polybutenes. Waxes are lower melting paraffin materials. Antioxidants routinely used are hindered phenols, thioesters, and phosphites. These protect the polymer from heat degradation from exposure to heat and oxygen. The ultraviolet absorbers are usually hindered amines (derivatives of piperidine) or benzotriazole based absorbers.

A typical mixing cycle for a vertical type blender would take from one to five hours depending on the adhesive system being produced. The cycle would include a time for heating up the heavy steel kettle to the mixing temperature, followed by the addition and melting of the low viscosity components (tackifiers and waxes or oils), finishing up with multiple additions of the high viscosity components (polymers and elastomers) and additives.

A major drawback, of all three types of hot melt adhesive manufacturing processes described hereinbefore, is the potential for thermal oxidation of the adhesive to occur during the process. When the polymer sits on the side of a metal surface of the processing equipment for an extended period of time, or if too much heat builds up within the polymer during the high shear periods of mixing, then thermal oxidation or unwanted crosslinking will occur.

Applicants have solved this problem in the art by developing a process that is workable at lower temperatures and at lower shear rates, so that heat degradation during the adhesive manufacture can be minimized or eliminated. Specifically, Applicants have surprisingly discovered a process for manufacturing hot melt adhesives that does not involve the use of excessive shear forces, nor high processing temperatures. Thus, the potential for thermal oxidation of the adhesive is minimized.

SUMMARY OF THE INVENTION

An improved process for making hot melt adhesive compositions comprising the steps of:

(a) dissolving hot melt adhesive components into a room temperature or higher solution of a water soluble substituted lactam, e.g. NMP, to form a water soluble substituted lactam (e.g. NMP)/hot melt adhesive component solution;

(b) adding said solution formed in step (a) into water to form a solid;

(c) extracting out the water soluble substituted lactam, e.g. NMP, from said solid formed in step (b);

(d) drying of said solid wherein water soluble substituted lactam, e.g. NMP, is leached out as in step (c) to form the hot melt adhesive.

In the process of the present invention the hot melt adhesive components are dissolved in a water soluble substituted lactam, e.g. NMP, at much lower temperatures than are encountered in the normal hot melt adhesive production processes. After all of the hot melt adhesive components are dispersed in the a water soluble substituted lactam, e.g. NMP, the final solution is contacted with water to form a solid substance, which is then dried. The drying removes any excess water or water soluble substituted lactam, e.g. NMP, that may be trapped within the solid hot melt material.

DETAILED DESCRIPTION OF THE INVENTION

An improved process for making hot melt adhesive compositions comprising the steps of:

(a) dissolving hot melt adhesive components into a room temperature or higher solution of a water soluble substituted lactam, e.g. NMP, to form a water soluble substituted lactam (e.g. NMP)/hot melt adhesive component solution;

(b) adding said solution formed in step (a) into water to form a solid;

(c) extracting out the water soluble substituted lactam, e.g. NMP, from said solid formed in step (b);

(d) drying of said solid wherein water soluble substituted lactam, e.g. NMP, is leached out as in step (c) to form the hot melt adhesive.

Specifically, the present invention involves the adding of the hot melt adhesive components to a warm water soluble substituted lactam (e.g. NMP) and letting the hot melt adhesive components dissolve and mix together in the water soluble substituted lactam (e.g. NMP) to form a water soluble substituted lactam solution (e.g. NMP)/hot melt adhesive component solution). Then, the water soluble substituted lactam(e.g. NMP)/hot melt adhesives component solution is added to water (or water vapor) to form a solid. The water soluble substituted lactam solution (e.g. NMP) is extracted from said solid in water to form hot melt adhesive particles.

DEFINITIONS AND USAGES OF TERMS

The term "water soluble substituted lactam (e.g. NMP)/ hot melt adhesive component solution" as used herein refers to the solution which is formed when the hot melt adhesive polymer components are blended and dispersed into the water soluble substituted lactam of which NMP is preferred.

The term "adding" as used herein refers to titration as droplets, spraying, atomizing, and extrusion of the water soluble substituted lactam/hot melt adhesive component solution into water or steam.

Hot Melt Adhesive Components Useful in the Practice of the Present Invention Hot melt adhesive components include, but are not limited to, the polyamides (nylons), polyesters, polystyrene, styrene based polymers such as styrene butadiene rubber, and styrene isoprene rubber, ethylene vinyl acetate polymers, poly acrylate based polymers, polyvinyl chloride polymers, and urethane resin systems.

The hot melt adhesive components can optionally be blended with other components, including, but not limited to, polyolefins, such as polyethylene. Further, tackifier resins may also be added to the hot melt adhesive components. Common tackifier resins are the various rosin or rosin ester systems, aromatic hydrocarbon resin systems (usually coal tar extracts), terpene resins, aliphatic hydrocarbon resins (containing some small degree of unsaturation) and heat reactive tackifier resin systems (usually a blend of aromatic and aliphatic diene resins). The thermoplastic polymer chosen as the base for the adhesive will determine the tackifier resin choice. Usually the tackifier resin has a lower melting point than the base polymer. Additionally, waxes, oils and antioxidants may be optionally added.

Water Soluble Substituted Lactams Useful in the Practice of the Present Invention Water soluble substituted lactams useful in the practice of the present invention include, but are not limited to the N-substituted-alpha-pyrrolidones such as N-methyl-α-pyrrolidone (NMP), N-ethyl-α-pyrrolidone (NEP), N-n-propyl-α-pyrrolidone (NPP), N-iso-propyl-α-pyrrolidone (NIPP), N-n-butyl-α-pyrrolidone(NBP), N-isobutyl-α-pyrrolidone (NIBP) and N-n-pentyl-α-pyrrolidone(NPeP) and, N-cyclohexyl pyrrolidone (NCP), preferably N-methyl pyrrolidone (NMP). Further, mixtures of water soluble substituted lactams may be used, such as NMP and NEP, NMP and NPP.

Water insoluble substituted pyrrolidones may be optionally added in small amounts. Useful water insoluble substituted pyrrolidones, include, but are not limited to, N-n-hexyl-α-pyrrolidone, N-cycloalkyl-α-pyrrolidones such as N-cyclohexyl-α-pyrrolidone, N-chained alkyl-α-pyrrolidones such as N-n-decyl-α-pyrrolidone, and N-alkyl-α-pyrrolidone such as N-benzyl-α-pyrrolidone. Said water insoluble substituted pyrrolidones may be added to the water soluble substituted lactam (e.g. NMP) dissolving media, in small amounts, so that when the NMP/hot melt adhesive component solution is dripped into water the water insoluble pyrrolidone remains with the bead and is not extracted or leached out by the water.

Finally, the Applicants' process can be adapted to suit the final form in which the hot melt adhesive is desired, e.g beads, powders, films and rods. Also, the temperatures of the various mixing, solid forming, and drying processes are solely determined by the polymer used as the base for the adhesive. The Applicant' process of dissolving the hot melt adhesive components in the water soluble substituted lactam, e.g NMP, to form a solution, adding said solution to water to form a solid, and then drying the solids formed can be carried out entirely at room temperature, i.e. 20–30 degrees C. The final product resulting from Applicant' process is a hot melt adhesive. If desired, heating the water soluble substituted lactam, e.g NMP, will cause the hot melt adhesive components to dissolve at a quicker rate, and heating up the water into which the water soluble substituted lactam (e.g NMP)/hot melt adhesives components solution is added will aid in extracting or leaching out any residual water soluble substituted lactam, e.g NMP, from the adhesives solids at a faster rate. Drying is accomplished by putting the solids into a hot air dryer or by drying under vacuum.

PROCESSES FOR PREPARING DIFFERENT FORMS OF HOT MELT ADHESIVES

I. BEAD FORM HOT MELT ADHESIVES

The hot melt adhesive formed by the process of the present invention can take the form of solid hot melt adhesive beads.

Generally, hot melt adhesive beads will be formed if the total amount by weight of the hot melt adhesive components added to the water soluble substituted lactam, e.g NMP, is preferably about 2 to 40% of the weight of the NMP, more about 5 to 30%, and most preferably about 10 to 20% of the weight of the NMP. The size of the bead and density of the bead is determined by the solution solids content. The higher the solids content, the larger and more dense the beads. Again, the desired bead size and density will be determined by the end use application of the adhesive. Thus, solution solids content is determined by end use application of the hot melt adhesive.

The water soluble substituted lactam (e.g NMP)/hot melt adhesive component solution is mixed so that all of the ingredients are dissolved. Optionally tackifier resin, oil and/or wax, and antioxidants may be added. The order of addition of each component is not critical. All of the hot melt adhesive components should be soluble in the water soluble substituted lactams, preferably, NMP. Further, the optional additives should be soluble in the water soluble substituted lactam, preferably, NMP.

Mixing time can vary depending on both the base hot melt adhesive components chosen, and the temperature of the water soluble substituted lactam, preferably NMP. For example, using room temperature NMP as the dissolving medium, and a thermo plastic urethane resin as the polymer, time of mixing would be about 4–5 hours. If a polyvinyl chloride resin is taken as the base, and room temperature NMP is used for mixing, batch time would be 1–2 hours. If the temperature of the NMP is increased, the times of mixing will decrease to an extent that is determined by how much the temperature is raised: the higher the temperature, the shorter the batch time. Agitation also facilitates the dissolving of the components.

The totally dispersed water soluble substituted lactam (e.g NMP)/hot melt adhesive component solution is then added into agitated water. When the desired end product is a pellet or bead shaped hot melt adhesive, then one way to accomplish the formation of the bead or pellet is to add the NMP/hot melt adhesive component solution into the water. The water should be agitated at a slow speed. As soon as a droplet of said solution comes into contact with the water, a semi solid bead is formed. The slow agitation of the water prevents these, initially tacky, beads from sticking to themselves.

The outer layer and surface of the bead is a porous solid film. Deeper into the initial bead is a gel type of material that is a mixture of NMP/hot melt adhesive components plus small amounts of water. As the initial bead sits in water for longer periods of time, the water gradually penetrates into the bead, extracting, i.e leaching out, the NMP and turning the hot melt adhesive components, which are all water insoluble, into solids. The duration of the extracting time in the water depends upon both the temperature of the water, and the amount of NMP the user wants to leave trapped within the bead. Usually the duration of extracting time can vary anywhere from 10 minutes to 40 hours or more. Further, the extracting process can be advanced by placing the water and newly formed beads into a pressure vessel, such as an autoclave at 10–100 psi. The pressure will force the water into the hot melt beads, thus speeding up the extracting process. The temperature and pressure of the autoclave are determined by the amount of water soluble substituted lactam, preferably NMP, that is to be left behind in the adhesive, and the type of polymer chosen as the adhesive base.

Once the NMP extracting process is complete, the hot melt adhesive beads are filtered away from the water and dried to remove any surface water or residual water soluble substituted lactam (e.g. NMP)/water in the outer layers of the beads. One method for drying the beads is to place them into a stream of hot forced air. The removal of residual amounts of water soluble substituted lactam, preferably NMP, and water from the top layer of the hot melt adhesive beads is also accomplished by drying in an oven having a vacuum applied to it. The combination of heat and vacuum will remove the trace amounts of NMP/water, at a faster rate than simple hot air.

The water used in the process of the present invention is recycled by distillation. (either batch or continuous). Water boils at a much lower temperature than either the water soluble substituted lactam, preferably NMP, or the adhesive components. In the distillation unit, the water is boiled away from the water soluble substituted lactam, preferably NMP and the residual adhesive components. The water is reused in the extracting process, and the water soluble substituted lactam, preferably NMP/residual adhesive components can be reused in the mixing step.

II. THIN FILM FORM HOT MELT ADHESIVES

The hot melt adhesive formed by the process of the present invention can be in the form of thin films of solid hot melt adhesive.

The hot melt adhesive components are preferably about 5 to 40% by weight of the water soluble substituted lactam, preferably NMP, more preferably about 10 to 30 % by weight and most preferably about 15 to 25% by weight. The water soluble substituted lactam (e.g. NMP)/hot melt adhesive component solution is extruded from the mixing tank, through a narrow rectangular die opening and into a bath of flowing water. The water in the bath flows away from the mixing tank in the same direction that the water soluble substituted lactam (e.g NMP)/hot melt adhesive component solution is extruded. The water also flows (or moves) at the same rate as the speed at which the narrow band of water soluble substituted lactam (e.g NMP)/hot melt adhesive component solution exits the mixing tank. As soon as the band of water soluble substituted lactam (e.g NMP)/hot melt adhesive component solution is extruded through the narrow rectangular die opening and contacts the water a solid or semi solid film is formed. After an extraction or leaching time in the water, which is dependent upon the temperature of the water and the thickness of the film, the film is put through a hot forced air drying oven, and the final hot melt adhesive film is rolled up with an inner lining material to prevent self sticking.

The thickness of the hot melt adhesive film depends on the concentration of the hot melt adhesive components in the solution and/or the thickness of the narrow rectangular die opening from which the water soluble substituted lactam (e.g NMP)/hot melt adhesive component solution is extruded. The concentration of the hot melt adhesive components in NMP and the size of the die used will depend on the type of polymer chosen as the base hot melt adhesive component.

Finally, when a hot melt adhesive is produced with a twin screw extruder mixer the end product is a hot melt adhesive in web or sheet form. A web of hot liquid adhesive is extruded from the twin screw extruder mixer and onto a cooled stainless steel belt. As the belt moves through a distance, the liquid adhesive gives up heat, and hardens into a solid hot melt adhesive film. At the end of the stainless steel belt, the solid film is rolled up. Usually a polyolefin liner material is wound up on top of the adhesive sheet to prevent self sticking.

III. EXTRUDED RODS FORM HOT MELT ADHESIVES

The hot melt adhesive formed by the process of the present invention can be in the form of extruded rods of hot melt adhesives.

The hot melt adhesive components are, preferably, about 30 to 70% by weight of NMP, more preferably about 35 to 65% and most preferably about 40 to 60%. The hot melt adhesive components are added to the water soluble substituted lactam (NMP) and mixed at temperatures in the 80–100 C. range with a slow speed paddle type mixer or with a shear blender at lower speeds. At room temperature, the water soluble substituted lactam (e.g NMP)/hot melt adhesive component solution will be either a semi liquid paste or a nonflowable gel like material which is extruded by pumping or pushing with air through a fixed shape pipe or hose into a tank of flowing water. The water is flowing away from the end of the pipe at the same rate as the speed at which the NMP/hot melt adhesive component solution is flowing from the pipe. The conventionally known method of applying a vacuum to the contents of the pipe and passing it through screen filters to remove entrapped air in these thick solutions ensures solid rods with no air voids and a high quality end product.

Upon contacting and immersing in the water, the thick solution immediately becomes a semi solid rod in the shape of the opening through which it is extruded by pumping or pushing with air. The water soluble substituted lactam (e.g NMP) is extracted or leached out of the rod during the extracting process and a solid hot melt adhesive is formed. The duration of the water extracting or leaching process is determined by the temperature of the water as well as whether or not pressure (10–100 psi) is being applied to the extracting/leaching tank at some point during the leaching process.

The hot melt adhesive rod then leaves the water and passes through a forced hot air oven, on a conveying belt, and the residual water soluble substituted lactam (e.g. NMP) and residual water is removed. The dried rod is then cut into pieces of a predetermined length. An alternative method for drying the adhesive rods, would be to roll up a shaped rod to a desired length, and stack rolls (similar to winding a hose up for storage) of the rods on top of each other in a vacuum dryer. When the vacuum and heat are applied to the stacked rolls, even rolls that have gone through the pressurized water leaching process are dried at fast rates.

IV. POWDER FORM HOT MELT ADHESIVES

The hot melt adhesive formed by the process of the present invention can be made in the form of powder. The particles have high surface area and conduct heat at quick rates for melting or re-solidifying purposes. The hot melt adhesive components are preferably about 0.1 to 60% by weight, more preferably about 1 to 60 % and most preferably about 2 to 55% by weight of the water soluble substituted lactam, preferably, NMP.

Powders are formed when droplets of the water soluble substituted lactams, preferably NMP/hot melt adhesive component solution are contacted with water or water vapor by spraying to form small solid particles or powder.

Several powder production methods are possible. Specifically, the first method involves spraying low viscosity, low solids water soluble substituted lactam, preferably, NMP/hot melt adhesives component solution into liquid water. The water can be either hot or at room temperature. The water should be agitated to prevent the particles from sticking together and forming lumps during the water leaching phase of the process. Agitation of the water should be such that a highly turbulent/churning (like rapids in a river) condition exists on the surface, ensuring a rapid covering of each individual water soluble substituted lactam, preferably NMP/hot melt adhesives solution particle by the water. This strong agitation allows the particles to be transferred into the water very rapidly. The faster the transfer of the atomized particles, into the water, the faster the solution can be sprayed, which ultimately leads to higher production rates.

The water leaching (extracting) step will be fast for any powder manufacturing process since the high surface area of the powder particles allows for fast wicking of water soluble substituted lactam, preferably NMP, out of the polymer matrix. The rate of water soluble substituted lactam, preferably NMP, removal, will be dependent upon the adhesive particle size, and the temperature of the water. When the water extracting phase is complete the powder is filtered away from the water mixture and dried using conventional methods known to those skilled in the art for drying fine surface area powders.

Additionally, the dilute (low viscosity) NMP/hot melt adhesive component solution can be sprayed into a vessel or chamber containing a concentrated atmosphere of steam. The vessel can be a simple metal tank that has steam injected into the bottom of it. The walls of the container are heated to a certain height to prevent the steam from condensing out of the air prior to contacting the atomized NMP/hot melt adhesive component solution. In the tank, below the entrance point of the NMP/hot melt adhesive adhesive component solution, cooling or condensing coils are located, so that the metal walls will be cooled for the purpose of promoting the condensation of the steam into liquid water at that point. This prevents the steam vapors from contacting the tip of the spray nozzle, emitting the NMP/hot melt adhesive component solution. Contact of the steam with the nozzle may cause a build up of a solid polymeric material that could either plug the nozzle, or build up to a thickness that could interfere with the spraying of the solution.

A more advanced form of this method involves a sealed vessel, such as a reactor or autoclave, that has either a vacuum, or pressure (10–100 psi) applied to the contents. The vessel has a continual stream of steam added to it at the bottom of the vessel. An air bleed off vent is located in the vessel at a level higher up than the entrance point for the sprayer head. Cooling or condensing coils are located on the metal walls of the vessel in the general air just above and below the air exit bleed vent. Cooling or condensing coils can also be located outside the vessel as a separate unit. The remainder of the surface area of the vessel is maintained at a temperature (depending on the vacuum applied) to keep the water in form of steam. Steam will be continually added to the vessel. Hot melt adhesive powder will be formed when the atomized water soluble substituted lactam (e.g NMP)/hot melt adhesive component solution contacts the steam. This powder will be filtered out of the wet steam/ NMP solution and then dried. The NMP/adhesive component residue will be reused, and the condensed water will be re-boiled into steam.

The ability to use small amounts of water (steam) to precipitate the powdered hot melt adhesive, means less total volume of water soluble substituted, NMP/water solution to boil water away from during recycling. This is beneficial, since the initial water soluble substituted lactam (e.g. NMP) /hot melt adhesive component solution is of such a low total solids, high liquid composition.

The second method involves the spraying of the high viscosity, high solids water soluble substituted lactam (e.g NMP)/hot melt adhesive component solution into a water atmosphere. The high solids solution typically has 50–60% hot melt adhesive components, with 30–40% being the lower end of what is considered high solids. Using a BEHR spinning bell high solids paint application system, a solution containing 50–60% solids can be atomized. This type of application equipment is commonly used in the automotive industry to apply high solids paints to car bodies. Once the high solids solution is atomized into small particles, said solution can be contacted with water to leach out the excess water soluble substituted lactams, preferably NMP, in the same way as for the low solids application described hereinbefore. See, Behr ECO BELL technical literature, 5 Design and Function, Ident No L405-09GB05, incorporated by reference herein.

Finally, representative texts discussing drying fine surface area powders include, but are not limited to, Masters, K: "Spray Drying Handbook", 5th ed., Longman Scientific & Technical, John Wiley & Sons, New York, 1991; Van't Land, C. M., "Industrial Drying Equipment: Selection and Application", Marcel Dekker, Inc., New York, 1991; Perry, R. H., Green D., Perry's Chemical Engineers Handbook, 6th Edition, pp. 20–5 and 20–6, McGraw-Hill, Inc., 1984.

THE UTILITY OF THE PRESENT INVENTION

The following non limiting examples illustrate the utility of the Applicant' invention, i.e. a method for making hot melt adhesives in different forms without the use of high shear forces and excess temperatures.

EXAMPLE 1
(BEADS)

A 250.0 ml pyrex glass beaker was placed onto a heating plate/magnetic stirrer unit. 100.0 grams of N-methyl pyrrolidone (NMP) was added to the beaker along with a 1.5 inch long stirring magnet. The magnetic stirrer control was turned on to a medium setting. The temperature control was left in the Off position. Mixing took place at room temperature.

The first component added to the NMP was 11.0 grams of green colored expanded polystyrene packing peanuts that were retrieved from a trash receptacle. The peanuts were added slowly, several at a time, and allowed to quickly dissolve into the NMP. Total time until all the peanuts were mixed in was approximately 20 minutes. Next, 20.4 grams of aromatic petroleum resin tackifier (PICCO® 6100) (Hercules Inc., Wilmington, Del.) was added to the solution. The solution was allowed to mix for 1 hour to allow for the dissolution of the PICCO® 6100. Then, 0.2 grams of hindered phenolic antioxidant (IRGANOX® 1010) from CIBA-GEIGY, Hawthorne, N.Y. The final solution was mixed for 10 minutes, and then poured into an 8 oz glass sample bottle. The resultant hot melt adhesives component/ NMP solution was clear in appearance (no precipitated or suspended materials) and had a green color (the polystyrene foam packing peanuts were green).

A 2000 ml pyrex beaker was placed onto a magnetic stirrer apparatus, and a 3 inch long stirring magnet was placed into the beaker. Added to the beaker was 1000 ml of tap water, and 0.3 grams of nonionic linear alcohol alkoxylate surfactant (PLURAFAC® RA-20 (BASF Corporation, Mt. Olive, N.J.) surfactant. The water and RA-20 were allowed to mix for 5 minutes at a medium speed. Then using a glass eye dropper, the solution prepared above, was titrated into the water. (Water remained agitated at medium speed while NMP/hot melt adhesive component solution was titrated into it). As each drop of solution came into contact with the water, a solid bead of hot melt adhesive was formed. About 350–400 beads (approx. 0.25 inch in diameter) were produced. The beads were placed in the room temperature water for 20 hours to allow for the extracting (leaching) of NMP out of the beads. Then, the beads and water were separated, and the beads were placed in a forced air oven (60° C.) for 1 hour to drive off any water/NMP that is close to the surface of the beads. The resultant Hot Melt Adhesive beads were then stored in a 4 oz glass bottle.

EXAMPLE 2

A piece of cold rolled steel (2 inches×5 inches×30 mils) was placed into a hot forced air oven with the temperature set at 100° C.–110° C. On top of one end, of the steel plate, was placed approximately 1 gram of Hot Melt Adhesive beads that were produced in Example 1 above. The beads were allowed to sit on the metal plate for 15 minutes to heat up and soften/flow together.

A second steel plate, (of similar dimensions to the sheet containing the adhesive beads) was put into the oven at the same time as the first sheet. At the 15 minute mark, using insulated gloves, the second steel plate was picked up and placed on top of the sheet containing the adhesive beads. The plates were pressed firmly together by hand, and then allowed to cool to room temperature until they adhered.

EXAMPLE 3

(BEADS)

A 250.0 ml pyrex beaker, containing a 1.5 inch long stirring magnet, was placed onto a hot plate/magnetic stirrer apparatus. 100.0 grams of NMP was added to the beaker, and the stirring mechanism was turned on to a medium speed. Also, the hot plate heating element was turned on, and the temperature of the NMP was raised to 80° C.

At this point, 0.35 g of IRGANOX 1010 antioxidant was added to the hot NMP, and immediately went into solution. 26.0 grams of LURAN®S (BASF Corporation, Mt. Olive, N.J.) styrene acrylonitrile acrylate resin, was added to the NMP solution. The virgin resin was added slowly, (agitation was maintained throughout the whole component addition process) so as not to cause agglomeration of semi solvated resin. The NMP begins dissolving the resin as soon as it contacts it. If the resin is dumped into the NMP all at once, the partially solvated pellets stick together in clumps that take longer to fully dissolve. The LURAN®S resin was allowed to mix in the hot NMP for approximately 40 minutes.

After the LURAN®S resin was thoroughly dissolved in the NMP, 40.2 grams of PICCO® 6100 tackifier resin was added to the solution. The hot melt adhesive component/NMP solution was allowed to mix for an additional 30 minutes after the addition of the tackifier resin. The heating element was then turned off, and the solution was allowed to cool to room temperature. The hot melt adhesive component/NMP solution was then poured off into an 8 oz glass bottle for storage. Due to chemical complexing of the NMP and the aromatic based PICCO® Resin, the solution attained a purplish color. This is typical for mixtures of NMP and certain aromatics.

A 2000 ml pyrex beaker containing a three inch long stirring magnet, was placed onto a hot plate/magnetic stirrer apparatus. 1000 ml of tap water containing 0.2 grams of PLURAFAC® RA-20 were added to the beaker, and both the heating and stirring elements were turned on. The water temperature was gradually increased to 63° C., and then maintained at this temperature for the remainder of the process. The agitator was maintained at a medium speed.

The hot melt adhesive component/NMP solution prepared above was titrated into water using an eyedropper. Upon contact with the water, the solution created solid hot melt adhesive beads approximately ⅓ of an inch in diameter. As the NMP was extracted (leached) out of the adhesive, the color of the solid changed from a pinkish purple to a yellowish white (PICCO® Resins are brownish yellow in color). Approximately 400–500 beads were titrated into the hot water. The agitation was shut off, and the beaker was placed in a hot forced air oven set a 65° C. for 12 hours to allow the NMP to be extracted (leached) out from the center of the adhesive beads. The water and beads were separated, and the beads were placed back in to the hot forced air oven (65° C.) for approximately 30 minutes, to drive off any residual NMP/$H_2O$ that is close to the surface of the beads.

EXAMPLE 4

A flat thin sheet of aluminum (3 inches×4 inches×25 mils) was placed into a hot forced air oven (temperature setting 140° C.). Onto the center of the sheet was placed approximately 2.0 grams of the hot melt adhesive beads prepared in Example 3. Also placed into the same oven was a 50 ml pyrex beaker, having a bottom diameter of 2.0 inches. The aluminum plate, hot melt adhesive beads, and beaker were allowed in the oven for 15 minutes to insure the beads would attain proper flow/softening temperature.

At the 15 minutes mark, the oven was opened, and, using insulated gloves, the beaker was picked up and the bottom glass was placed onto the hot melt adhesive beads. The beaker was pressed firmly against the aluminum/beads to insure contact. The beaker/adhesive/aluminum sheet construction was taken out of the oven and quickly cooled to room temperature. The glass beaker was strongly adhered to the surface of the aluminum sheet.

EXAMPLE 5

(THIN FILM)

60.0 grams of the NMP/hot melt adhesive component (LURAN®S based) solution, compounded in Example 3, was placed in a 100 ml pyrex beaker and heated to 65° C., in a forced air oven. Also placed into the oven was a flat thin sheet of aluminum (3 inches×4 inches×25 mils). The LURAN®S solution and aluminum sheet were in the oven for approximately 15 minutes.

While the solution and aluminum sheet were heating up, a pyrex pan (10 inches×6 inches×2 inches) was filled with tap water to within 0.25 inches from the top. The tap water was room temperature (24° C.).

Using two pairs of stainless steel tongs, the NMP/hot melt adhesive component solution and aluminum plate were removed from the oven. With one set of tongs, the aluminum sheet was held at approximately a 45° angle about one inch above the surface of the water in the pan. While slowly moving the aluminum sheet, from one end of the pan towards the other, using the second set of tongs, the NMP/hot melt adhesive component solution was poured onto the sheet. The solution ran down the sheet and onto the surface of the water leaving a solid film, upon contact with the water. The top surface of the film initially had some areas of liquid NMP/hot melt adhesive solution in between solid areas. These areas had not had contact with the water. But as the film was totally submerged into the water, these areas solidified. The thin film was left in the water for 1 hour to allow for NMP to be extracted (leached) away from the adhesive. The film was then removed from the water and let air dry in room temperature air. The hot melt adhesive film, formed on the water, was about 2 inches in width, about 6–7 inches in length, and 2–3 mils thick.

EXAMPLE 6

Two pieces of cardboard (the backing from a legal pad; about 2 inches×5 inches×50 mil) were placed into a hot forced air oven (140° C.). On one piece of cardboard was placed a section (2 inches×3 inches) of LURAN®S based thin film hot melt adhesive produced in Example 5. The pieces of cardboard and adhesive were allowed to heat up for 10 minutes. Then, using stainless steel tongs, the piece of cardboard free of any adhesive was placed on top of the cardboard containing adhesive. The two pieces were pressed firmly together with a one kilogram weight, and then removed from the oven and cooled to room temperature. The two pieces of legal pad backing cardboard were adhered tightly together.

EXAMPLE 7
(POWDER)

A 250.0 ml pyrex beaker containing a 1.5 inch stirring magnet was placed onto a hot plate/magnetic stirrer apparatus. 100.0 grams of NMP were added to the beaker, and the speed control for the magnetic stirrer was set at a medium setting, and remained in that position throughout the mixing process. The heating element control was left in the off position, and also remained there for the entire mixing cycle.

Once the agitation was started, 4.1 grams of PICCO® 6100 tackifier resin was added to the NMP. Immediately after the addition of the PICCO® resin, 0.05 g of IRGANOX® 1010 was placed in the NMP. Five minutes later, 2.0 grams of GEON® 110×334 polyvinyl chloride resin, the GEON® Company, Cleveland, Ohio, was slowly added to the hot melt adhesive component solution. Polyvinyl chloride resins are also very soluble in NMP, and if the resin is dumped in all at once, the particles become stuck together in a clump, as the NMP quickly makes the surface of each particle tacky. Mixing was continued for an additional forty-five minutes. The dilute hot melt adhesive component solution was then poured off into an eight ounce glass bottle for storage.

A 2000 ml pyrex beaker containing a 3 inch stirring magnet was placed onto a hot plate/magnetic stirrer apparatus.

About 1000 ml of tap water was added to the beaker, and the stirring mechanism was turned on and set at a medium speed setting, where it remained for remainder of the trial. Heating element control was left in the off position. Using a glass eye dropper the hot melt adhesive component (e.g GEON®)/NMP solution was titrated into the water. Immediately upon contacting the water, small solid particles of wet hot melt adhesive were formed. All the solution that had been prepared before hand, was titrated into the water.

The solid particles were filtered away from the water, and then scraped off of the filter paper and placed into a glass petrie dish. The dish was placed into a forced air oven set at 80° C. for twenty minutes to remove surface water from the particles. After removal from the oven, and cooling to room temperature, the fine powder polyvinyl chloride based hot melt adhesive was weighed. 5.4 grams of solid powder hot melt adhesive had been produced.

On a production scale, the GEON®/NMP solution is sprayed into water, as opposed to titrating with an eyedropper.

EXAMPLE 8

Into a forced air oven, temperature set at 110° C., was placed a piece of a cardboard box (6.5 inches×3.75 inches×0.125 inches) that had 3.7 grams of the GEON® based hot melt adhesive powder produced in Example 7, spread out over a surface area of about 1 inch by 4 inches. The area covered by the powder was near the middle of the piece of cardboard. Also placed into the oven, at the same time, was a strip of thin cardboard (the backing from a legal pad; 2 inches×5 inches×50 mil). The pieces of cardboard and adhesive were allowed to heat up for twenty minutes. Then using stainless steel tongs, the legal pad backing cardboard was placed onto the top of the softened GEON® based powder adhesive. The two pieces of cardboard were pressed firmly together with a 1 kilogram weight. The laminated cardboard construction was removed from the oven and cooled to room temperature. The two pieces of cardboard were adhered together with GEON® based hot melt adhesive.

We claim:

1. An improved process for making hot melt adhesive compositions comprising the steps of:
    (a) dissolving hot melt adhesive components into a 20° C. to 80° C. solution of a water soluble substituted lactam to form a water soluble substituted lactam/hot melt adhesive component solution;
    (b) adding said solution formed in step (a) into water to form a solid;
    (c) extracting out the water soluble substituted lactam from said solid formed in step (b);
    (d) drying of said solid wherein the water soluble substituted lactam is leached out as in step (c) to form the hot melt adhesive.

2. An improved process for making hot melt adhesive compositions comprising the steps of:
    (a) dissolving hot melt adhesive components into a 20° C. to 80° C. solution of N-methyl pyrrolidone to form an N-methyl pyrrolidone/hot melt adhesive component solution;
    (b) adding said solution formed in step (a) into water to form a solid;
    (c) extracting out the N-methyl pyrrolidone from said solid formed in step (b);
    (d) drying of said solid wherein N-methyl pyrrolidone is leached out as in step (c) to form the hot melt adhesive.

3. A process according to claim 1, wherein step (c) is accomplished in 10 min–36 hrs.

4. A process according to claim 1, wherein step (c) is accomplished under 10–100 psi pressure.

5. A process according to claim 1 wherein step (d) is accomplished by forced air drying.

6. A process according to claim 1 wherein step (d) is accomplished by vacuum drying.

7. A process for making hot melt adhesive compositions in the form of beads comprising the steps of:
    (a) dissolving hot melt adhesive components into a 20° C. to 80° C. solution of N-methyl pyrrolidone to form an N-methyl pyrrolidone/hot melt adhesive component solution;
    (b) dripping the N-methyl pyrrolidone/hot melt adhesive component solution into the water to form a solid;
    (c) extracting out the N-methyl pyrrolidone from said solid formed in step (b);
    (d) drying of said solid wherein N-methyl pyrrolidone is leached out as in step (c) to form the hot melt adhesive.

8. A process according to claim 7, wherein step (c) is accomplished in 10 min–36 hrs.

9. A process according to claim 7, wherein step (c) is accomplished under 10–100 psi pressure.

10. A process according to claim 7 wherein step (d) is accomplished by forced air drying.

11. A process according to claim 7 wherein step (d) is accomplished by vacuum drying.

12. A process for making hot melt adhesive compositions in the form of powders comprising the steps of:
    (a) dissolving hot melt adhesive components into a 20° C. to 80° C. solution of N-methyl pyrrolidone to form an N-methyl pyrrolidone/hot melt adhesive component solution;

(b) spraying or dripping said N-methyl pyrrolidone/hot melt adhesive component solution into water to form a solid;

(c) extracting out the N-methyl pyrrolidone from said solid formed in step (b);

(d) drying of said solid wherein N-methyl pyrrolidone is leached out as in step (c) to form the hot melt adhesive.

13. A process according to claim 12, wherein step (c) is accomplished in 10 min–36 hrs.

14. A process according to claim 12, wherein step (c) is accomplished under 10–100 psi pressure.

15. A process according to claim 12 wherein step (d) is accomplished by forced air drying.

16. A process according to claim 12 wherein step (d) is accomplished by vacuum drying.

17. A process for making hot melt adhesive compositions in the form of rods comprising the steps of:

(a) dissolving hot melt adhesive components into a 20° C. to 80° C. solution of N-methyl pyrrolidone to form an N-methyl pyrrolidone/hot melt adhesive component solution;

(b) extruding said N-methyl pyrrolidone/hot melt adhesive component solution into water to form a solid;

(c) extracting out the N-methyl pyrrolidone from said solid formed in step (b);

(d) drying of said solid wherein N-methyl pyrrolidone is leached out as in step (c) to form the hot melt adhesive.

18. A process according to claim 17, wherein step (c) is accomplished in 10 min–36 hrs.

19. A process according to claim 17, wherein step (c) is accomplished under 10–100 psi pressure.

20. A process according to claim 17 wherein step (d) is accomplished by forced air drying.

21. A process according to claim 17 wherein step (d) is accomplished by vacuum drying.

22. A process for making hot melt adhesive compositions in the form of film 2–3 mils thick comprising the steps of:

(a) dissolving hot melt adhesive components into a 20° C. to 80° C. solution of N-methyl pyrrolidone to form an N-methyl pyrrolidone/hot melt adhesive component solution;

(b) extruding said N-methyl pyrrolidone/hot melt adhesive component solution thru narrow rectangular die opening into water to form a solid;

(c) extracting out the N-methyl pyrrolidone from said solid formed in step (b);

(d) drying of said solid wherein N-methyl pyrrolidone is leached out as in step (c) to form the hot melt adhesive.

23. A process according to claim 22, wherein step (c) is accomplished in 10 min–36 hrs.

24. A process according to claim 22, wherein step (c) is accomplished under 10–100 psi pressure.

25. A process according to claim 22 wherein step (d) is accomplished by forced air drying.

26. A process according to claim 22 wherein step (d) is accomplished by vacuum drying.

* * * * *